United States Patent
Beugels et al.

(10) Patent No.: US 8,329,084 B2
(45) Date of Patent: Dec. 11, 2012

(54) PROCESS FOR THE MANUFACTURE OF A SHAPED PART AND SHAPED PART OBTAINABLE WITH SAID PROCESS

(75) Inventors: Jean H. M. Beugels, Landgraaf (NL); William A. C. Roovers, Sittard (NL); Martin A. Es,Van, Brunssum (NL); Roelof Marissen, Born (NL); Hen Hoefnagels, Hulsberg (NL)

(73) Assignee: DSM IP Assets B.V., Heerlen (NL)

( * ) Notice: Subject to any disclaimer, the term of this patent is extended or adjusted under 35 U.S.C. 154(b) by 839 days.

(21) Appl. No.: 12/293,655

(22) PCT Filed: Mar. 21, 2007

(86) PCT No.: PCT/EP2007/002515
§ 371 (c)(1), (2), (4) Date: Mar. 26, 2009

(87) PCT Pub. No.: WO2007/107359
PCT Pub. Date: Sep. 27, 2007

(65) Prior Publication Data
US 2010/0162458 A1    Jul. 1, 2010

(30) Foreign Application Priority Data
Mar. 21, 2006   (EP) ..................................... 06075677

(51) Int. Cl.
| F41H 1/02 | (2006.01) |
| A42B 1/06 | (2006.01) |
| B29C 70/44 | (2006.01) |
| B32B 5/12 | (2006.01) |

(52) U.S. Cl. ................. 264/258; 428/113; 2/2.5; 2/410; 2/412

(58) Field of Classification Search ........................ None
See application file for complete search history.

(56) References Cited

U.S. PATENT DOCUMENTS

| 4,613,535 | A | * | 9/1986 | Harpell et al. ................ 428/113 |
| 5,480,706 | A | * | 1/1996 | Li et al. .......................... 428/113 |
| 5,794,271 | A | | 8/1998 | Hastings |
| 2009/0280708 | A1 | * | 11/2009 | Marissen et al. .............. 442/181 |

FOREIGN PATENT DOCUMENTS

| DE | 196 52 517 | 6/1997 |
| DE | 199 22 799 | 11/2000 |
| FR | 2 444 415 | 7/1980 |
| NL | 8 403 529 | 6/1986 |
| WO | 00/24811 | 5/2000 |
| WO | WO 2005/065910 | 7/2005 |

OTHER PUBLICATIONS

International Search Report for PCT/EP2007/002515 mailed Jul. 5, 2007.

* cited by examiner

*Primary Examiner* — Camie Thompson
(74) *Attorney, Agent, or Firm* — Nixon & Vanderhye P.C.

(57) ABSTRACT

The invention relates to a process for the manufacture of a shaped part comprising the steps of—forming a stack by stacking (2) or more sheets comprising mono-layers of unidirectional anti-ballistic fibers and a binder followed by placing the stack in a mould, clamping the stack in the mould with a control member closing the mould—consolidating the stack under temperature and pressure into a curved shaped part. The invention furthermore relates to products obtainable with said process, which are very suitable for use in anti-ballistic applications and include e.g. helmets, curved panels, cones and domes.

26 Claims, No Drawings

PROCESS FOR THE MANUFACTURE OF A SHAPED PART AND SHAPED PART OBTAINABLE WITH SAID PROCESS

This application is the U.S. national phase of International Application No. PCT/EP2007/002515 filed Mar. 21, 2007 which designated the U.S. and claim priority to European Patent Application No. 06075677.2 filed Mar. 21, 2006, the entire contents of each of which are hereby incorporated by reference.

The invention relates to a process for the manufacture of a shaped part and to a shaped part obtainable with said process. Shaped parts obtainable with said process are very suitable for use in anti-ballistic applications and include e.g. helmets, curved panels, cones and domes.

A process for the manufacture of a shaped part is known from U.S. Pat. No. 4,613,535. This publication discloses the manufacture of a shaped part by stacking sheets comprising mono-layers with anti-ballistic fibers onto a rigid layer, followed by compressing. In the sheets, the anti-ballistic fibers are embedded in a thermoplastic matrix, the matrix having a modulus of less than 41 MPa. Example 2 in U.S. Pat. No. 4,613,535 discloses the production of a cured rigid layer by coating two 2×2 basket weave Kevlar® 29 fabrics with a general purpose epoxy resin followed by curing between Apollo plates at 105° C. and a pressure of 0.41 MPa during 90 minutes. Onto this cured rigid layer, sheets comprising mono-layers of unidirectional high performance polyethylene (HPPE) fibers in a polystyrene-polyisoprene-polystyrene matrix were stacked such that the fiber direction in each mono-layer is perpendicular to the fiber direction in an adjacent layer, followed by pressing between two platens in a hydraulic press at approximately 0.55 MPa and 130° C. followed by cooled to 50° C. under pressure.

Disadvantage of the process according to U.S. Pat. No. 4,613,535 is that when a curved shaped part is produced, such as e.g. a helmet, the ballistic performance hereof varies with the position on the curved shaped part.

Objective of the invention is to provide a process for the manufacture of a shaped part the ballistic performance hereof varies less with the position on the curved shaped part.

This objective is achieved with a process according to the invention comprising the steps of:
  forming a stack by stacking 2 or more sheets comprising mono-layers of unidirectional anti-ballistic fibers and a binder whereby in the stack, the fiber direction in a mono-layer is at an angle α to the fiber direction in an adjacent layer followed by
  placing the stack in a mould,
  clamping the stack in the mould with a control member
  closing the mould
  consolidating the stack under temperature and pressure into a curved shaped part, followed by removing the shaped part from the mould.

With the process according to the invention a shaped part is produced with less variation in ballistic performance between positions on the curved shaped part, than shaped parts produced with the process according to U.S. Pat. No. 4,613,535. A curved shaped part in this application means a part with a double curvature, i.e. curved, i.e. deviating from a plane surface, along 2 mutually perpendicular axes.

An additional advantage of the process according to the invention is that shaped parts are produced in one step, making the process more efficient than the said known process.

In the process according to the invention the term mono-layer of unidirectional anti-ballistic fibers refers to a layer of a fibrous network of unidirectional oriented anti-ballistic fibers and a binder that basically holds the fibers together. The term unidirectional oriented fibers refers to fibers in one plane that are essentially oriented in parallel.

The term fiber comprises not only a monofilament but, inter alia, also a multifilament yarn or a flat tape. Width of the flat tape preferably is between 2 mm and 100 mm, more preferably between 5 mm and 60 mm, most preferably between 10 mm and 40 mm. Thickness of the flat tape preferably is between 10 μm and 200 μm, more preferably between 25 μm and 100 μm.

The anti-ballistic fibers in the mono-layer of the invention have a tensile strength of at least about 1.2 GPa and a tensile modulus of at least 40 GPa. These fibers may be inorganic or organic fibers. Suitable inorganic fibers are, for example, glass fibers, carbon fibers and ceramic fibers. Preferably the inorganic fibers are carbon fibers produced from polyacrilonitrile.

Suitable organic fibers with such a high tensile strength are, for example, aromatic polyamide fibers (so-called aramid fibers), especially poly(p-phenylene teraphthalamide), liquid crystalline polymer and ladder-like polymer fibers such as polybenzimidazoles or polybenzoxazoles, esp. poly(1,4-phenylene-2,6-benzobisoxazole) (PBO), or poly(2,6-diimidazo [4,5-b-4',5'-e]pyridinylene-1,4-(2,5-dihydroxy)phenylene) (PIPD; also referred to as M5) and fibers of, for example, polyolefins, polyvinyl alcohol, and polyacrylonitrile which are highly oriented, such as obtained, for example, by a gel spinning process. The fibers preferably have a tensile strength of at least 2 GPa, more preferably at least 2.5 GPa or most preferably at least 3 GPa. The advantage of these fibers is that they have very high tensile strength, so that they are in particular very suitable for use in lightweight ballistic-resistant articles.

Suitable polyolefins are in particular homopolymers and copolymers of ethylene and propylene, which may also contain small quantities of one or more other polymers, in particular other alkene-1-polymers.

Good results are obtained if linear polyethylene (PE) is selected as the polyolefin. Linear polyethylene is herein understood to mean polyethylene with less than 1 side chain per 100 C atoms, and preferably with less than 1 side chain per 300 C atoms; a side chain or branch generally containing at least 10 C atoms. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic viscosity (IV, as determined on solutions in decalin at 135° C.) of at least 4 dl/g; more preferably of at least 8 dl/g. Such polyethylene is also referred to as ultra-high molar mass polyethylene. Intrinsic viscosity is a measure for molecular weight that can more easily be determined than actual molar mass parameters like $M_n$ and $M_w$. There are several empirical relations between IV and $M_w$, but such relation is highly dependent on molecular weight distribution. Based on the equation $M_w = 5.37 \times 10^4 [IV]^{1.37}$ (see EP 0504954 A1) an IV of 4 or 8 dl/g would be equivalent to $M_w$ of about 360 or 930 kg/mol, respectively.

High performance polyethylene (HPPE) fibers consisting of polyethylene filaments that have been prepared by a gel spinning process, such as described, for example, in GB 2042414 A or WO 01/73173, are preferably used as anti-ballistic fiber. This results in a very good anti-ballistic/weight performance. A gel spinning process essentially consists of preparing a solution of a linear polyethylene with a high intrinsic viscosity, spinning the solution into filaments at a temperature above the dissolving temperature, cooling down the filaments to below the gelling temperature, such that gelling occurs, and stretching the filaments before, during or after the removal of the solvent.

The term binder refers to a material that binds or holds the fibers together in the sheet comprising mono-layers of unidirectional oriented fibers and a binder, the binder may enclose the fibers in their entirety or in part, such that the structure of the mono-layer is retained during handling and making of preformed sheets. The binder may be applied in various forms and ways; for example as a film (by melting hereof at least partially covering the anti-ballistic fibers), as a transverse bonding strip or as transverse fibers (transverse with respect to unidirectional fibers), or by impregnating and/or embedding the fibers with a matrix material, e.g. with a polymer melt, a solution or a dispersion of a polymeric material in a liquid. Preferably, matrix material is homogeneously distributed over the entire surface of the mono-layer, whereas a bonding strip or bonding fibers may be applied locally. Suitable binders are described in e.g. EP 0191306 B1, EP 1170925 A1, EP 0683374 B1 and EP 1144740 A1.

In a preferred embodiment, the binder is a polymeric matrix material, and may be a thermosetting material or a thermoplastic material, or mixtures of the two. The elongation at break of the matrix material is preferably greater than the elongation of the fibers. The binder preferably has an elongation of 2 to 600%, more preferably an elongation of 4 to 500%. Suitable thermosetting and thermoplastic matrix materials are enumerated in, for example, WO 91/12136 A1 (pages 15-21). In the case the matrix material is a thermosetting polymer vinyl esters, unsaturated polyesters, epoxies or phenol resins are preferably selected as matrix material. In the case the matrix material is a thermoplastic polymer polyurethanes, polyvinyls, polyacrylics, polyolefins or thermoplastic elastomeric block copolymers such as polyisoprene-polyethylene-butylene-polystyrene or polystyrene-polyisoprene-polystyrene block copolymers are preferably selected as matrix material. Preferably the binder consists of a thermoplastic polymer, which binder preferably completely coats the individual filaments of said fibers in a mono-layer, and which binder has a tensile modulus (determined in accordance with ASTM D638, at 25° C.) of at least 75 MPa, more preferably at least 150 MPa and even more preferably at least 250 MPa, most preferably of at least 400 MPa. Preferably the binder has a tensile modulus of at most 1000 MPa. Such a binder results in high flexibility of a sheet comprising a mono-layer, and of a high enough stiffness in a consolidated stack.

In the event that the anti-ballistic fiber is an inorganic fiber, the binder has a tensile modulus (determined in accordance with ASTM D638, at 25° C.) of preferably at least 500 MPa, more preferably at least 750 MPa. In the event that a very rigid sheet comprising a mono-layer is required the tensile modulus preferably is at least 1500 MPa.

Preferably, the amount of binder in the mono-layer is at most 30 mass %, more preferably at most 25, 20, or even at most 15 mass %. This results in the best ballistic performance.

In the process according to the invention a stack is formed by stacking 2 or more sheets comprising mono-layers of unidirectional anti-ballistic fibers and a binder whereby in the stack, the fiber direction in a mono-layer is at an angle α to the fiber direction in an adjacent layer, whereby α is preferably between 5 and 90°, more preferably between 45 and 90° and most preferably between 75 and 90°.

The obtained stack is generally placed in an open mould, generally consisting of a female and a male part, and subsequently the stack is clamped to one part of the mould, generally the female part. This clamping is done through a so-called control member and is done in such a way that the stack is fixed in its position towards the said female mould part, but that the stack can still slip and move during the closing of the mould, i.e. when moving of the male part into the female mould part. This clamping through the control member may suitably be done by pressing the stack at its outer regions against the female mould part. The force with which the control member is clamped to one part of the mould preferably ranges between 50 and 5000N, more preferably between 100 and 3000N and can be optimized by a skilled man through some routine experimentation. During optimization the skilled man will chose a clamping force high enough to press the stack to the female mould part, while this clamping force is low enough to allow the stack to slip and move into the female mould part upon closing of the mould.

After the stack is clamped to one part of the mould, the mould is closed e.g. by moving the male part into the female mould part thereby pressing and settling the stack in the shape of the mould.

Subsequently the stack is consolidated under temperature and pressure into a shaped part, i.e. a curved shaped part. In the case the matrix material is a thermoplastic polymer, consolidating is performed by cooling the stack after melting of the thermoplastic polymer. In the case the matrix material is a thermosetting polymer, consolidating is performed by heating and reacting the thermosetting polymer, subsequently the stack is cooled.

The temperature during consolidating generally is controlled through the mould temperature. The temperature during melting or reacting generally is chosen below the temperature at which the anti-ballistic fiber loses its high mechanical properties due to e.g. melting. Preferably the mould temperature is at least 10° C., preferably at least 15° C. and even more at least 20° C. below the melting temperature of the fiber. In case the fiber does not exhibit a clear melting temperature, the temperature at which the fiber starts to lose its mechanical properties should be read instead of melting temperature. The temperature at which the fiber starts to lose its mechanical properties is in this application referred to as softening temperature. In the case of e.g. HPPE fibers, often having a melting temperature of 155° C., a mould temperature below 135° C. generally will be chosen. The minimum temperature generally is chosen such that a reasonable speed of consolidation is obtained. In this respect 50° C. is a suitable lower temperature limit, preferably this lower limit is at least 75° C., more preferably at least 95° C., most preferably at least 115° C.

The pressure during consolidating preferably is at least 7 MPa, more preferably at least 10 MPa, even more preferably at least 13 MPa and most preferably at least 16 MPa. In this way a better anti-ballistic performance is achieved. Optionally this consolidating may be preceded by a low pressure pre-shaping step. Pressure during this pre-shaping step may vary between 2 and 5 MPa. After pre-shaping and before consolidating the mould may be opened and the occurrence of blisters may be verified, which may subsequently be removed by e.g. piercing with a sharp object. Other options to prevent blisters include degassing during moulding or use of vacuum.

The optimum time for consolidation generally ranges from 5 to 120 minutes, depending on conditions such as temperature, pressure and part thickness and can be verified through routine experimentation.

In the case the matrix material is a thermoplastic polymer, the stack is cooled to consolidate. Preferably cooling is performed while maintaining pressure. This yields a higher anti-ballistic performance. Cooling is done until the shaped part reaches a temperature of at most 90° C., preferably at most 75° C., more preferably at most 50° C. As soon as the shaped part has reached this temperature the mould can be opened and the shaped part is released from the mould. Possible debris is subsequently cut from the shaped part. Moreover the shaped part may further be processed through known mechanical techniques as sawing, grinding, drilling to the desired final dimensions.

In a preferred embodiment of the process according to the invention, the 2 or more sheets comprising mono-layers of unidirectional anti-ballistic fibers and a binder are rectangular sheets, and more preferably square sheets, in which sheets the direction of the anti-ballistic fibers is parallel to a diagonal of said sheets. This results in the least amount of debris to be removed from a consolidated product. Reduction of the amount of debris is an important issue, especially for high performance anti-ballistic fibers such as e.g. HPPE and aramids. This is of advantage especially regarding the high costs of these fibers.

During the forming of the stack in the process according to the invention optionally at least one layer of fabric of a second anti-ballistic fiber may be placed on or between the 2 or more sheets comprising mono-layers of unidirectional anti-ballistic fibers and a binder. Once the stack is formed this layer of fabric of a second anti-ballistic fiber may be at any position throughout the stack, but this layer of fabric is preferably positioned in such a way in the stack that the fabric is close to a strike face of the shaped part obtained with the process. In a special embodiment the fabric may even form the strike face of the curved shaped part obtained with the process according to the invention. The strike face of the shaped part is the side of the product facing the ballistic impact. The layer of fabric may comprise a binder chosen from the earlier listed polymers.

The second anti-ballistic fiber may be chosen from the earlier listed range of anti-ballistic fibers. In a special embodiment of the process according to the invention, the unidirectional anti-ballistic fibers and the second anti-ballistic fiber in the layer of fabric are based on the same kind of polymer. This yields a shaped part with lowest chance of delamination between the stack and the fabric. Most preferably this anti-ballistic fiber is based on polyethylene fiber, preferably obtained via the earlier mentioned gel-spinning process.

Preferably in the process of the invention the unidirectional anti-ballistic fiber is an organic fiber and the second anti-ballistic fiber is an inorganic fiber.

In a preferred embodiment of the process according to the invention the anti-ballistic fiber or the second the anti-ballistic fiber in at least one of the layers closest to the strike face is embedded in a thermoset matrix. In this way a more rigid shaped part is obtained. This thermoset matrix is chosen from the group of thermosetting polymers as already listed above.

In yet another preferred embodiment of the process according to the invention a part of the rectangular or square sheets in the stack is interchanged with sheets of a smaller surface area, preferably with round shaped sheets such as e.g. oval or circular sheets. In this case the ratio of the surface area of such round sheet to such rectangular or square sheet may range from 2 to 75 wt %, preferably from 5-60% and more preferably from 10-40% (unless otherwise specified, percentages in this application are weight percent). The fiber direction in the oval or circular sheets is chosen such that it is at an angle $\alpha$ to the fiber direction in an adjacent mono-layer, whereby $\alpha$ is between 5 and 90°. The ratio of the number of round sheets to rectangular or square sheets may range from 2-20%, preferably from 4 to 10%. This results in an improved surface quality of the curved shaped part. Preferably at least one or more rectangular or square sheet is alternated with at least one oval or circular sheet. Preferably the at least one oval or circular sheets are positioned closest to the strike face, in the event of a helmet often referred to as 'the crown'. This means that fewer sheets comprising monolayers of unidirectional anti-ballistic fibers are positioned between the at least one oval or circular sheet and the strike face, than sheets comprising monolayers of unidirectional anti-ballistic fibers between the oval or circular sheets and the surface opposite to the strike face. Generally the rectangular or square sheets and the oval or round sheets are stacked such that their respective centers are on top of each other. Preferably the oval or circular sheets are positioned on top of each other, without any other layers in between. Preferably the diameter of the oval or round sheets differs in order to have an improved surface quality of the obtained curved shaped part.

In another preferred embodiment, in the process according to the invention the stack of 2 or more sheets comprising mono-layers of unidirectional anti-ballistic fibers and a binder with the direction of the anti-ballistic fibers in each mono-layer at an angle $\alpha$ to the fiber direction in an adjacent mono-layer, furthermore comprises at least one carbon fiber sheet. A carbon fiber sheet is a sheet comprising woven or non woven, including unidirectional oriented, carbon fibers and preferably a binder, said binder being chosen from the ranges as listed previously. Preferably the carbon fiber sheet consists of carbon fibers and a binder. The surface area of the carbon fiber sheet may be equal to the surface area of the said sheets comprising the mono-layers of unidirectional anti-ballistic fibers and a binder.

Preferably the surface area of the carbon fiber sheet is at most 80% of the surface area of the said sheets comprising the mono-layers of unidirectional anti-ballistic fibers and a binder, more preferably said surface area of the carbon fiber sheet is at most 60%, even more preferably the surface area of the carbon fiber sheet is at most 30% of the surface area of the said sheets comprising the mono-layers of unidirectional anti-ballistic fibers and a binder.

The surface area of the carbon fiber sheet may be in a form covering the center of the said sheets comprising the mono-layers. Such surface may be in the form of a closed circle. An advantage hereof is that a shaped part, e.g. in the form of a helmet, as obtained with the process according to the invention gives additional protection against top-impact from e.g. falling rocks. Preferably this carbon fiber sheet is in a position in the stack close to the strike face. The inventors have furthermore found that such carbon fiber sheet in a form covering the center part of a shaped part, while having a smaller surface area than the final shaped part, may be very well be used in any other shaped part not comprising unidirectional fibers and subject to impact, and more specifically subject to ballistic impact. In this way the mentioned advantages of improved protection against top-impact are maintained.

The surface area of the carbon fiber sheet may however also be in a form not covering the center part of the said sheets comprising the mono-layers. Such surface may be in the form of an open circle or an annular ring. An advantage hereof is that a shaped part, e.g. in the form of a helmet, as obtained with the process according to the invention gives a higher stiffness in the sideways direction. This means that a person wearing such helmet has a further improved side protection of e.g. his ears upon impact. Preferably this carbon fiber sheet is in a position in the stack close to the surface of the stack opposite to the strike face. The inventors have furthermore found that such carbon fiber sheet in a form not covering the center part of a shaped part, i.e. a carbon fiber sheet with a cut out—preferably a central cut out—, may be very well be used in any other shaped part not comprising unidirectional fibers and subject to impact, and more specifically subject to ballistic impact. In this way the mentioned advantages of improved side protection are maintained.

Consequently said carbon fiber sheet is very suitable for use in the manufacture of curved shaped parts comprising especially organic anti-ballistic fibers. Preferably these organic anti-ballistic fibers are the said gel spun polyethylene or aramid fibers. Depending on the requirements of a given application of such shaped part both mentioned surface areas of carbon fiber sheets may be combined in one shaped part.

In still another preferred embodiment of the process according to the invention, a central part of the stack of sheets comprising mono-layers of unidirectional anti-ballistic fibers and a binder, and the optional at least one layer of fabric have a cut out, e.g. in the form of a circular area of said layers being cut out leaving a central open space. Generally such circular area will have a surface area of less than 60%, preferably less than 40% of the surface area of the mono-layer. Advantage hereof is that it is possible to produce curved shaped parts in the form of e.g. a helmet with an open top which is beneficial for tropical areas. Alternatively the central open space may be cut out of a consolidated shaped part The process according to the invention may also be conducted in the same favourable manner with a stack of fabric instead of a stack of mono-layers of unidirectional anti-ballistic fibers. Most preferred however is the process according to the invention with mono-layers of unidirectional anti-ballistic fibers since such a process results in a product with a higher anti-ballistic performance.

The process according to the invention yields a shaped part with less variation in ballistic performance between positions on the curved shaped part, than shaped parts produced by a process according to U.S. Pat. No. 4,613,535. Consequently the present invention also relates to a curved shaped part obtainable by the process according to the invention. An additional advantage of the curved shaped part according to the present invention is that it shows a higher Vo value, i.e. the highest speed of a bullet or a fragment without perforation of the part, at a given weight. Curved shaped parts obtainable by the process according to the invention include e.g. helmets, helmet shells, curved panels, cones and domes.

Consequently the invention also relates to a shaped curved part comprising 2 or more sheets, each sheet comprising mono-layers of unidirectional anti-ballistic fibers and a binder with the direction of the anti-ballistic fibers in each mono-layer at an angle α to the fiber direction in an adjacent mono-layer, and at least one carbon fiber sheet. Preferably the unidirectional anti-ballistic fiber is the said polyethylene fiber, more preferably HPPE; aramid fiber or ladder-like polymer fiber. More preferably the unidirectional anti-ballistic fiber is the said polyethylene fiber. This gives the lightest possible curved shaped part while still offering good protection e.g. against ballistic threat.

The curved shaped parts obtainable by the process according to the invention are very suitable for use in the manufacture of anti-ballistic articles.

Test Methods as Referred to in the Present Application, are as Follows

IV: the Intrinsic Viscosity is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration;

Side chains: the number of side chains in a UHPE sample is determined by FTIR on a 2 mm thick compression moulded film, by quantifying the absorption at 1375 $cm^{-1}$ using a calibration curve based on NMR measurements (as e.g. in EP 0269151);

Tensile properties (measured at 25° C.): tensile strength (or strength), tensile modulus (or modulus) and elongation at break (or eab) are defined and determined on multifilament yarns as specified in ASTM D885M, using a nominal gauge length of the fiber of 500 mm, a crosshead speed of 50%/min. On the basis of the measured stress-strain curve the modulus is determined as the gradient between 0.3 and 1% strain. For calculation of the modulus and strength, the tensile forces measured are divided by the titre, as determined by weighing 10 meters of fiber; values in GPa are calculated assuming a density of 0.97 $g/cm^3$. Tensile properties of thin films were measured in accordance with ISO 1184(H);

Anti-ballistic test Procedure: Shooting was performed using 1.1 gram Fragment simulating projectiles (FSP). Shooting was performed with an intended FSP speed being about equal to the expected V50 (680 meters/second). The actual FSP speed was measured before impact. In case a perforation occurred, the speed of the next shot was reduced with an anticipated amount of 15 m/second (it should be noted that accurate setting of the FSP speed on forehand is not possible. The amount of explosive and the way of charging allow an estimated setting of the speed only. However the measurement of the speed before impact is very accurate. In case the projectile was stopped, the next intended FSP speed was increased with 15 m/second.

Each helmet was subjected to eight shots around the rim of the helmet at about equal distance of each other and at a distance of about 6 cm of the edge of the helmet (edge effects are thus excluded)

The final V50 was determined as the average of the three highest speeds with a stop, and the three lowest speeds yielding a perforation. The same numbers are used for calculating the standard deviation. Other shots were considered to be too far from V50 for being relevant and, as such, these results were neglected.

EXAMPLE 1

A square shaped stack with dimensions of 59 cm×59 cm was made of 92 sheets of mono-layers comprising unidirectional aligned fibers and 8 circular sheets of mono-layers comprising unidirectional aligned fibers, whereby the fiber direction in each mono-layer is at an angle of 90° with respect to an adjacent monolayer. The composition of the stack of monolayers was, counted from the later strike face, 8 square sheets of 59*59 cm, with the direction of the anti-ballistic fiber parallel to the diagonal of the square sheet, 8 circular sheets with mono-layers with unidirectional aligned fibers with a circular surface area (diameter of 30 cm) and 84 of the said square sheets. The center of each circular sheet was positioned on top of the center of an adjacent sheet. Each monolayer comprising gel spun polyethylene fibers having a strength of 35 cN/dtex and 19 wt % of a polyurethane matrix and whereby the areal density of a monolayer is 63 $g/m^2$. The complete stack was positioned in a controlled clamp mould, in the form of a helmet, said mould comprising a female and male part and a control member. A clamping pressure of about 2000N was applied to the control member such that the stack was flat and fixed in its position towards the said female mould part, but that the stack could still slip and move during the closing of the mould. The mould was closed by lowering the male part into the female part of the mould whereby the flat stack slowly was positioned against the female mould surface. This closing was done slowly in a time span of 5 minutes in order to have a temperature transfer from the male and female mould part to the stack. The temperature of the mould was about 125-130° C. The applied pressure was 5 MPa and the stack was retained in the mould until the temperature at the centre of the stack was 120° C. Subsequently, the pressure was increased to a compressive pressure of about 20 MPa, and the stack was kept under this pressure for 15 minutes. Next, the stack was cooled to a temperature of 60° C. at the same compressive pressure. Subsequently the mould was opened and debris was cut from the helmet to obtain a smooth helmet edge.

The helmets produced had a weight, expressed as area density, of 7.4 kg/m². Thickness of the helmets was on average 10.5 mm and the circumference was 75 cm. The produced helmets are referred to as helmet number 1 and 2.

Comparative Experiment A

A square shaped stack with dimensions of 59 cm×59 cm was made of 100 mono-layers comprising unidirectional aligned fibers, whereby the fiber direction in each mono-layer is at an angle of 90° with respect to an adjacent monolayer. Each monolayer comprising gel spun polyethylene fibers having a strength of 35 cN/dtex and 19 wt % of a polyurethane matrix and whereby the areal density of a monolayer is 63 g/m². The complete stack was positioned on the female part of a standard mould, in the form of a helmet, said mould comprising a female and male part. The mould was closed by lowering the male part into the female part of the mould whereby the stack slowly was positioned against the female mould surface. This closing was done slowly in a time span of 5 minutes in order to have a temperature transfer from the male and female mould part to the stack. The temperature of the mould was about 125-130° C. The applied pressure was 5 MPa and the stack was retained in the mould until the temperature at the centre of the stack was 120° C. Subsequently, the pressure was increased to a compressive pressure of about 20 MPa, and the stack was kept under this pressure for 15 minutes. Next, the stack was cooled to a temperature of 60° C. at the same compressive pressure. Subsequently the mould was opened and debris was cut from the helmet to obtain a smooth helmet edge.

The produced helmets are referred to as helmet number A and B.

Results

The helmets according to the invention (numbered 1 and 2) were tested along with the two conventional helmets made with a process according to the state of the art (numbered A and B).

Helmets 1 and 2 showed a lower standard deviation due to the lower variability in material performance. Furthermore helmets 1 and 2 show a high V50 as well as a high Vo value: the fragment speed at which virtually no fragments perforated the helmet.

TABLE 1

Results of anti-ballistic tests

| Parameter | Helmet | | | |
|---|---|---|---|---|
| | 1 | 2 | A | B |
| $V_{50}$ (m/s) | 692 | 688 | 674 | 675 |
| $V_0$ (m/s) | 644 | 655 | 608 | 615 |
| Standard deviation on $V_{50}$ (m/s) | 16 | 11 | 22 | 20 |

It is vitally important that material consistency of life protecting products such as helmets is as good as possible. Incidental weak spots and the low perforation speeds related to that, impose additional risks on lethal injury. Correspondingly, the maximum velocities ($V_0$) at which material effectively functions (i.e virtually no perforation) is a very important performance indicator. Measurement of Vo is extremely elaborate and no risk of perforation is statistically not probable. A practical approximation of V0 is the speed at which only $1/100^{th}$ of the projectiles will cause a perforation. This Vo is adequately estimated with the 3-σrule, i.e. V50-3*standard deviation. The helmets of the present invention (numbered 1 and 2) yield withstand higher collision speeds without failure (perforation). This superior performance is reflective of the process used which produces a curved sharp part with less structural variation.

EXAMPLE 2

A helmet (numbered '3') was produced according to Example 1, however this process was interrupted during the pressurization to 5 MPa by removing the male part to open the mould, shortly after the center of the stack reached 120° C. The precompressed helmet remained in the female part of the mould. A number of 5 carbon fiber sheets of a width of about 10 cm were put at the inner surface of the helmet, the lateral side of the carbon fiber sheets being aligned with the rim of the helmet. In this way an annular ring of carbon fiber was put in the helmet. The carbon fiber sheets comprise unidirectional aligned carbon fiber areal density amounted to about 200 g/m2. A commercially available carbon fiber, produced from polyacrylonitrile, was used. The carbon fiber sheet furthermore comprised 38 wt % of a binder based on a thermoset epoxy resin system.

The mould was closed again and pressurized with 5 MPa for 3 minutes to allow the carbon fiber sheets to also obtain the mould temperature.

Subsequently, the procedure according to Example 1 was followed again and the pressure was increased to a compressive pressure of about 20 MPa, and the stack was kept under this pressure for 15 minutes, followed by the mentioned cooling to a temperature of 60° C. at the same compressive pressure.

The side protection of the helmet was measured by a side-displacement test. In this test the helmet was put in a tensile tester such that a given force was put on the sides of the helmet. The side positions on which the force was applied were the parts of the helmet protecting the ears of the wearer, thereby causing an indent of the helmet. The results are given in table 2.

TABLE 2

Results of side protection test

| Helmet | Force [N] | Side-displacement [mm] |
|---|---|---|
| 1 | 500 | 120 |
| 3 | 1100 | 10 |

For helmet 1 a force of 500N was applied which resulted in a side-displacement, an indent, of 120 millimeter, while the helmet number 3 showed only a side-displacement of 10 millimeter at a doubled force of 1100N. This clearly shows the improved side protection of these helmets.

The invention claimed is:

1. A process for the manufacture of a shaped part comprising the steps of:

forming a stack by stacking 2 or more sheets comprising mono-layers, said mono-layers comprising unidirectional anti-ballistic fibers and a binder which holds the fibers together, wherein the fibers have a tensile strength of at least about 1.2 GPa and a tensile modulus of at least 40 GPa,
whereby in the stack the direction of the anti-ballistic fiber in the sheets comprising mono-layers of unidirectional anti-ballistic fibers and a binder is at an angle $\alpha$ to the fiber direction in an adjacent monolayer, followed by
placing the stack in a mould,
clamping the stack in the mould with a control member such that the stack can slip and move during the closing of the mould,
closing the mould, and
consolidating the stack under temperature and pressure into a curved shaped part.

2. The process according to claim 1, wherein the sheets comprising mono-layers of unidirectional anti-ballistic fibers and a binder are rectangular sheets in which the direction of the anti-ballistic fibers is parallel to the diagonal of said rectangular sheets.

3. The process according to claim 2, wherein between 5 and 60 wt % of the rectangular or square sheets in the stack of mono-layers is interchanged with sheets of a smaller surface area.

4. The process according to claim 1, wherein the binder is a thermoplastic matrix with a tensile modulus of at least than 250 MPa.

5. The process according to claim 1, which comprises placing at least one layer of fabric of an anti-ballistic fiber during the forming of the stack on the 2 or more sheets comprising mono-layers of unidirectional anti-ballistic fibers and a binder.

6. The process according to claim 5, wherein the anti-ballistic fiber in the layer of fabric is embedded in a thermoset matrix.

7. The process according to claim 1, wherein the anti-ballistic fiber in at least one of the layers closest to a strike face is embedded in a thermoset matrix.

8. The process according to claim 1, wherein the anti-ballistic fiber is a polyethylene fiber.

9. The process according to claim 1, wherein the control member fixes the stack in the mould with a clamping force between 50 and 5000N.

10. The process according to claim 1, wherein the control member fixes the stack in the mould with a clamping force between 100 and 3000N.

11. The process according to claim 1, wherein the consolidating of the stack into a curved shaped part is done at a pressure of at least 7 MPa.

12. The process according to claim 1, wherein the consolidating of the stack into a curved shaped part is done at a pressure of at least 13 MPa.

13. The process according to claim 1, wherein the consolidating of the stack into a curved shaped part at a pressure of at least 7 MPa is preceded by a pre-shaping step by pressing the stack at a pressure between 2 and 5 MPa.

14. The process according to claim 1, wherein the consolidating of the stack into a curved shaped part is done at a mould temperature of at least 10° C. below the melting respectively softening temperature of the fiber.

15. The process according to claim 1, wherein the stack includes at least one carbon fibre sheet.

16. The process accordingly to claim 15, wherein the carbon fibre sheet comprises a plurality of mono-layers of unidirectional carbon fibres and a binder, wherein the direction of the carbon fibers is at an angle $\alpha$ to the fiber direction in an adjacent mono-layer.

17. The process according to claim 15, wherein the carbon sheet comprises woven carbon fibers.

18. The process according to claim 15, wherein the carbon sheet is between 20% and 80% of the surface area of the stack.

19. The process according to claim 18, wherein the carbon sheet forms an annular ring within the mould.

20. A curved shaped part obtained by the process of claim 1.

21. The curved shaped part according to claim 20, where in the curved shaped part has a area density of no more than 7.4 kg/m$^2$ and achieves a $V_0$ of at least 620 m/s using 1.1 gram fragment simulating projectiles (FSP).

22. The curved shaped part according to claim 20, wherein the anti-ballistic fibers are selected from the group consisting of glass fibers, carbon fibers, ceramic fibers, aramid fibers, ladder-like polymer fibers, polyacrylonitrile fibers, polyethylene alcohol fibers, linear polyethlene fibers and high performance polyethylene (HPPE) fibers.

23. The curved shaped part according to any one of claims 20-22, comprising 2 or more sheets, each sheet comprising mono-layers of unidirectional anti-ballistic fibers and a binder with the direction of the anti-ballistic fibers in each mono-layer at an angle $\alpha$ to the fiber direction in an adjacent mono-layer, and at least one carbon fiber sheet.

24. The curved shaped part according to claim 23 wherein the anti-ballistic fiber is polyethylene fiber.

25. The curved shaped part according to claim 23 wherein the anti-ballistic fiber is aramid fiber or ladder-like polymer fiber.

26. The curved shaped part according to claim 20, wherein the part has the shape of a helmet.

* * * * *